UNITED STATES PATENT OFFICE.

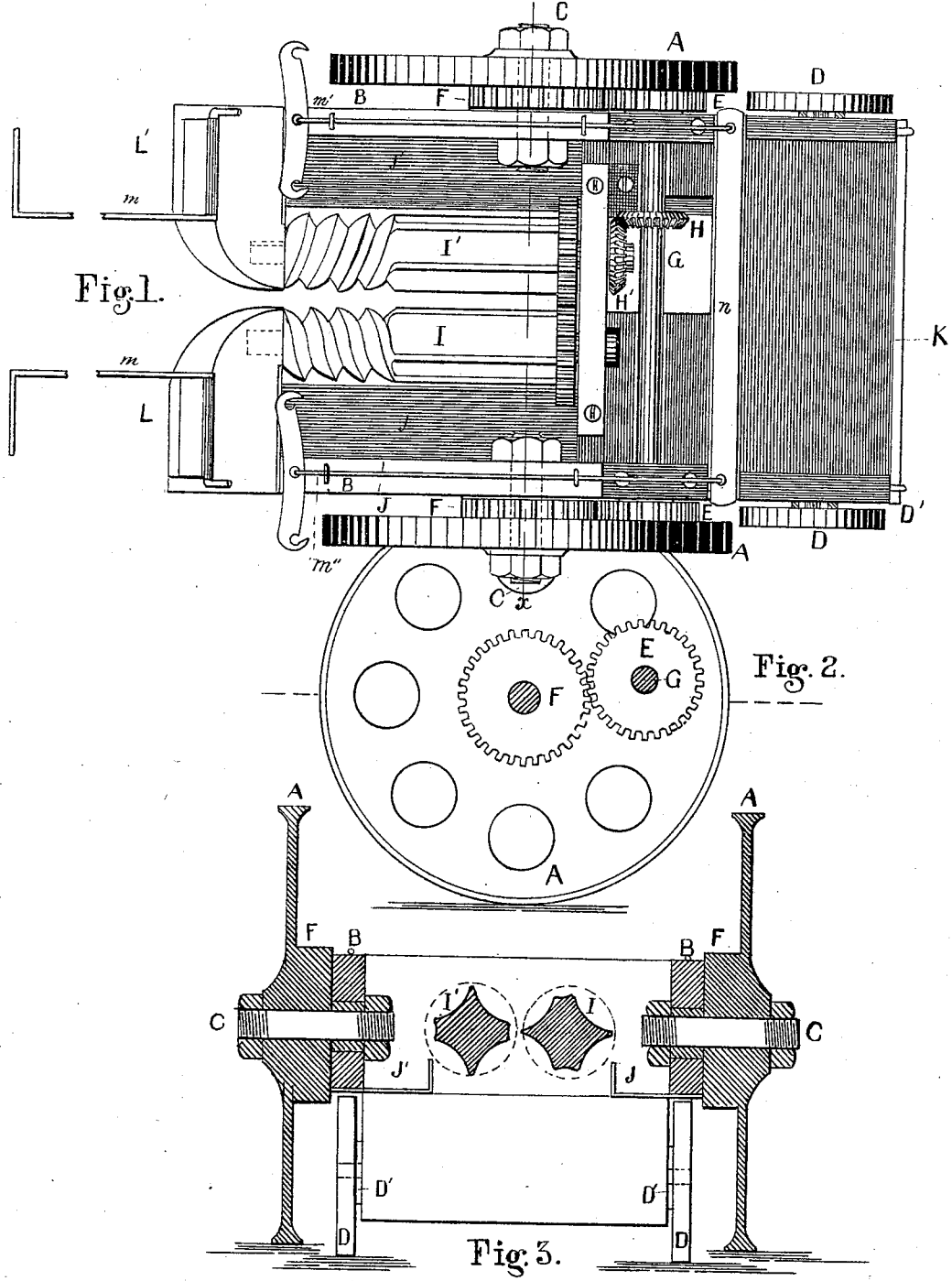

JAMES W. TERMAN, OF LOGANSPORT, INDIANA, ASSIGNOR OF ONE-HALF HIS RIGHT TO JOHN H. TUCKER AND SAMUEL E. HOWE, OF SAME PLACE.

IMPROVEMENT IN CORN-HARVESTERS.

Specification forming part of Letters Patent No. 196,400, dated October 23, 1877; application filed August 27, 1877.

*To all whom it may concern:*

Be it known that I, JAMES W. TERMAN, of Logansport, in the county of Cass and State of Indiana, have invented certain new and useful Improvements in Machines for Husking Indian Corn; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 represents a plan view of my improved machine, showing the carrying-wheels, small wheels attached to the receptacle for the husked ears of corn, the husking-rollers and the mechanism for driving them, the flaring-mouthed guide for directing the ears to the husking-rollers, the side conduits for directing the husked ears to the receptacle, and the hinged guides for guiding the stalks to the husking-rollers. Fig. 2 represents an elevation of the inside of one of the carrying-wheels, showing the gear-wheel attached thereto, and the smaller wheel which meshes therein, and which drives the husking-rollers; and Fig. 3 represents a sectional elevation on line $x$ $x$ of Fig. 1, showing the large and the small carrying-wheels, the means for adjusting the latter, the husking-rollers, and the receptacle for the husked ears of corn.

Similar letters denote like parts in all of the figures.

This invention relates to machines for picking ears of corn from the stalks upon which they grow, husking them, and delivering them into a receptacle carried upon the same machine, and from which they may be taken by an elevator and deposited in a wagon moved by the side thereof, if desired; and it consists in the construction, combination, and arrangement of some of the parts of which it is composed, as will be more fully explained hereinafter.

In constructing machines of this character I employ two large carrying-wheels, A A, one upon each side of the frame-work B B, to which they are secured by short axles C C, as shown in Figs. 1 and 2. These axles pass through the frame-work B, and are secured thereto by a nut, their outer ends projecting outward sufficiently far to allow them to receive the large carrying-wheels, which are held thereon by nuts, said wheels being allowed to rotate upon their respective axles.

In machines of this type it is necessary that provision should be made for elevating and depressing the forward end thereof, in order that the flaring-mouthed guides which gather the ears and conduct them to the husking-rollers may be raised or lowered to adapt them to stalks of different heights, and enable them to gather corn of small as well as of large growth. For making provision for this change of position, smaller carrying-wheels D D are attached to the receptacle at the rear of the machine, said wheels having their axis in a sliding plate, D', which may be attached to the sides of the receptacle and made to move up and down thereon, they being held in position by bolts passing through the sides of the receptacle. By these means the front end of the machine may be raised and lowered at pleasure, and its height adapted to the varying kinds of corn.

For the further carrying out of the above-described arrangement, another important arrangement of mechanism is necessary—namely, the adjustment of the driving-gearing in such a manner that when the above-described change is made the gearing will not be thrown out of mesh, and so the husking-rollers cease to move. It will be seen that when the front end of the machine is elevated to such an extent as to cause the flaring-mouthed guides to gather the ears from a heavy growth of corn, the axis of the gear-wheels E E, which drive the husking-rollers, sustains a very different relation to the axis of the larger driving-wheels to what it does when the forward end of the machine is depressed for the purpose of gathering the ears from a small growth of stalks, as in either position the axis of the large wheels is in the same plane; but with each change the axis of the gear-wheels D D is placed in a different plane with reference thereto.

Provision is made for this change by placing upon the inner surfaces of the larger carrying-wheels gear-wheels F F, which mesh into and drive the wheels D D, which are fixed to a shaft, G, which has its bearings in boxes placed in the frame-work B B, as a consequence of which, as the front end of the machine is raised or lowered, the wheels D D partially rotate around the wheels F F, they being similar in their operation to the sun and planet wheels. As a consequence of this arrangement, the wheels D D are always in mesh with the wheels F F, and give a constant movement to the shaft G. Upon this last-named shaft there is a beveled wheel, H, which meshes with and drives another beveled wheel, H', upon the outer end of the axis of one of the husking-rollers.

Centrally located between the larger carrying-wheels are two husking-rollers, I I', which are of peculiar construction, their forward ends being provided with screw-threads, so that as the ears of corn enter upon or between them, the husks are wholly or partially removed. The rear portions of these rollers are fluted or provided with projections and cavities, as shown in Fig. 3, the object of this form of construction being to bring one of the comparatively sharp edges of one of the rollers opposite one of the smaller depressions in the other, so that any husks which may remain on the ear may be taken therefrom, and the ear deposited in one of the side conduits J J'. These conduits consist of boxes of wood or of sheet metal, which are placed parallel with the husking-rollers, but below and outside thereof, so that the husked ears may, by the action of the rollers and the incoming ear, be thrown into them, and so allowed to pass back to the receptacle K in the rear of the machine, which action will take place owing to the fact that when the machine is in use the forward end is always elevated somewhat above the rear end. For gathering the ears from the stalks and directing them to the husking-rollers, flaring-mouthed guides L L' are provided, and arranged as shown in Fig. 1, so that as the machine is driven along astride the row of corn, the ears will be taken from the stalks, and guided to the husking-rollers, where they will be treated as above described. In order that the sides of the horses may be protected from the action of the standing corn, and that it may be prevented from being broken down, as well as be directed to the flaring-mouthed guides, rods M M are pivoted to said guides, and extend forward far enough to be attached to some part of the harness near the horses' heads, and so direct the corn to its proper place.

In providing for moving the machine forward, there is attached to the rear end of the frame-work an evener, N, pivoted at its center, from which two rods, N' N'', extend forward to the end of the frame-work, where whiffletrees are attached, to which to fasten the tugs of the harness, said whiffletrees being sufficiently far apart to allow one horse to work on one side of the row of corn, while the other horse is on the opposite side.

If found desirable, an elevator may be attached to the receptacle K, which will deliver the ears therefrom into a wagon or cart driven alongside of it.

Having thus described my invention, what I claim, and desire to secure by Letters Patent, is—

1. The husking-rollers I I', when constructed with a screw-thread upon one portion of their surfaces, and the irregularly-formed cavities and projections upon the other portions, substantially as and for the purpose set forth.

2. The combination of the frame-work B B of a husking-machine, the large carrying-wheels A A, and the smaller wheels D D, the latter being arranged in vertically-moving boxes, for the purpose of allowing of the adjustment of the height of the front end of the machine, as set forth.

In testimony that I claim the foregoing as my own I hereby affix my signature in presence of two witnesses.

J. W. TERMAN.

Witnesses:
JNO. R. MCNARY,
SETH B. PRATT.